(12) United States Patent
Zheng et al.

(10) Patent No.: US 11,852,734 B2
(45) Date of Patent: Dec. 26, 2023

(54) POSITIONING AND SYNCHRONIZATION

(71) Applicant: Hewlett Packard Enterprise Development LP, Houston, TX (US)

(72) Inventors: Jiguang Zheng, Beijing (CN); Bo Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 88 days.

(21) Appl. No.: 17/512,237

(22) Filed: Oct. 27, 2021

(65) Prior Publication Data

US 2023/0127943 A1 Apr. 27, 2023

(51) Int. Cl.
| | |
|---|---|
| G01S 19/14 | (2010.01) |
| G02B 6/38 | (2006.01) |
| H01R 13/62 | (2006.01) |
| H04B 7/185 | (2006.01) |
| H04J 3/06 | (2006.01) |

(52) U.S. Cl.
CPC ............ *G01S 19/14* (2013.01); *G02B 6/3893* (2013.01); *H01R 13/62* (2013.01); *H04B 7/18519* (2013.01); *H04J 3/06* (2013.01)

(58) Field of Classification Search
None
See application file for complete search history.

(56) References Cited

U.S. PATENT DOCUMENTS

| | | | |
|---|---|---|---|
| 7,817,661 B1 * | 10/2010 | Barkan | H04L 12/40032 370/463 |
| 8,165,471 B2 * | 4/2012 | Theodoras, II | H04L 49/40 398/139 |
| 8,774,639 B2 * | 7/2014 | Tang | H04B 10/40 398/139 |
| 9,077,452 B2 * | 7/2015 | Tang | H04L 49/352 |
| 9,276,689 B2 | 3/2016 | Geva et al. | |
| 9,325,408 B2 | 4/2016 | Parkkonen | |
| 9,472,898 B2 * | 10/2016 | Yang | H01R 13/6395 |
| 9,618,623 B2 | 4/2017 | Hann | |
| 9,648,547 B1 * | 5/2017 | Hart | H04L 41/12 |
| 10,135,538 B2 | 2/2018 | Coli et al. | |
| 10,375,669 B2 | 2/2019 | Edge et al. | |
| 10,244,491 B2 | 3/2019 | Ekstedt et al. | |
| 10,341,083 B2 | 7/2019 | Mayer et al. | |
| 2011/0194858 A1 | 8/2011 | Rotenstein et al. | |

(Continued)

FOREIGN PATENT DOCUMENTS

WO WO-20190198074 10/2019

*Primary Examiner* — Alpus Hsu

(74) *Attorney, Agent, or Firm* — Hewlett Packard Enterprise Patent Department

(57) ABSTRACT

Implementations of the present disclosure relate to positioning and synchronization of network device. A positioning and synchronization apparatus comprises an antenna. The apparatus also comprises a small form factor pluggable (SFP) connector comprising a first pin connected to a first pin of a SFP fiber port of a network device and a second pin connected to a second pin of the SFP fiber port. The apparatus also comprises a Global Navigation Satellite System (GNSS) receiver. The GNSS receiver is configured to receive signals comprising positioning-related information over the antenna and to provide a positioning signal over the first pin of the SFP connector and a pulse per second (PPS) signal over the second pin of the SFP connector.

20 Claims, 5 Drawing Sheets

(56) References Cited

U.S. PATENT DOCUMENTS

| | | | |
|---|---|---|---|
| 2015/0195604 A1* | 7/2015 | Synowiec | G06F 1/1601 |
| | | | 361/679.22 |
| 2016/0020844 A1* | 1/2016 | Hart | H04B 7/0617 |
| | | | 370/280 |
| 2018/0217265 A1 | 8/2018 | Pieroni et al. | |
| 2021/0364627 A1* | 11/2021 | Cai | G01S 19/35 |
| 2022/0232108 A1* | 7/2022 | Turner | H04L 69/08 |

* cited by examiner

POSITIONING AND SYNCHRONIZATION

BACKGROUND

Nowadays, 6 GHz band is widely used in access points (APs). In order to avoid interfering the existing cellular services, the APs are usually under control of Automatic Frequency Coordination (AFC). The APs can be located indoor or outdoor. Before operation, an AP needs to successfully connect to the AFC system, transmit its geographic location and identification information to the AFC system, and receive information about the available frequency range where it can work safely. Each AP may refresh the geographic location and identification information every 24 hour.

Moreover, as Time Sensitive Network (TSN, which may follow the IEEE802.1 protocol) develops, the time-related performance is essential for many applications including automotive networking, industrial networking and home entertainment networking. There are thus demands for accurate time synchronizations of network devices such as APs.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

As discussed above, some network devices require positioning and time synchronization information. Since a Global Navigation Satellite System (GNSS) receiver can not only supply positioning information but also supply about 10 ns accuracy PPS (plus per second) which is generally ideal for a synchronization reference, providing GNSS receivers in outdoor APs become more and more popular.

One straight-forward solution to provide network devices with GNSS receivers is to specifically build a GNSS receiver within each network device. However, such a solution is relatively inflexible. It is very hard to upgrade the network devices with a built-in GNSS receiver. Moreover, since the GNSSs develop fast, functions and protocols update very fast. A built-in GNSS receiver is then difficult or at least expensive to update. Furthermore, a dedicated GNSS antenna port has to be provided because the antenna may be left outside.

Another feasible solution is to provide a stand-alone GNSS receiver to connect to the network device. However, since there is no standard port for the GNSS receiver, dedicated ports need to be provided which would involve hardware modification. This solution is also expensive and rather inflexible.

To address the fallbacks discussed above, example implementations of the present disclosure relate to a positioning and synchronization apparatus.

Figure 1:
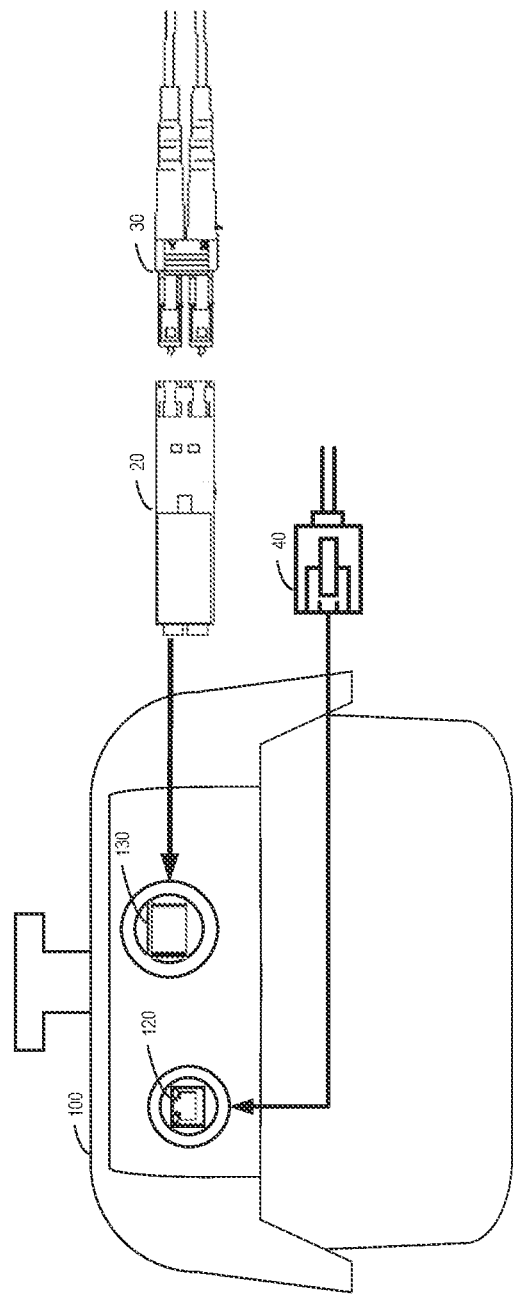
FIG. 1 illustrates an example network device in which example implementations of the present disclosure can be implemented.

FIG. 1 illustrates an example network device 100 in which example implementations of the present disclosure can be implemented, such as an AP, switch, base station and the like. As illustrated in FIG. 1, the network device 100 comprises a small form factor pluggable (SFP) fiber port 130. The SFP transceiver is a compact, hot-pluggable transceiver typically used for both telecommunication and data communications applications. An SFP connector in a networking device is used as a modular slot for a media-specific transceiver to connect a fiber-optic cable or sometimes a copper cable. The design and operation of the SFP are well specified by a Multi-Source Agreement (MSA). The SFP interfacing generally connects a network device motherboard (for a switch, router, media converter or similar device) to a fiber optic or copper networking cable for data transmission. Due to its high data transmission rate, it is a popular industry format jointly developed and supported by many network component vendors.

The SFP fiber port 130 is configured to be connected to a standard SFP connector of a SFP fiber transceiver 20. Further, the SFP fiber transceiver 20 is configured to be connected to a fiber-optic cable 30. When the SFP fiber transceiver 20 is inserted into the SFP fiber port 130, a data transmission path is established. The network device 100 may further comprise an Ethernet port 120. The Ethernet port 120 is configured to be connected to an Ethernet connector 40 to an Ethernet cable.

It is to be understood that the number of Ethernet ports and SFP fiber ports is only for the purpose of illustration without suggesting any limitations. A network device may comprise a plurality of Ethernet ports and SFP fiber ports.

Various example implementations of the present disclosure propose a positioning and synchronization apparatus compatible with a standard SFP fiber port. Specifically, a positioning and synchronization apparatus comprises an antenna. The apparatus further comprises a SFP connector comprising a first pin connected to a first pin of a SFP fiber port of a network device and a second pin connected to a second pin of the SFP fiber port. The apparatus further comprises a GNSS receiver configured to receive signals comprising positioning-related information over the antenna and to provide a positioning signal over the first pin of the SFP connector and a pulse per second (PPS) signal over the second pin of the SFP connector. By providing the network device with a positioning and synchronization apparatus via a SFP connector, the positioning and synchronization apparatus can be easily plugged into the network device without any hardware modification. The positioning and synchronization apparatus thus provides a large flexibility for enabling positioning and synchronization of the network device.

As used herein, the term "GNSS" may refer to systems providing positioning signals comprises satellite-transmitted signals, so-called Global Navigation Satellite Systems (GNSS). In particular, the GNSS may comprise the Global Positioning System (GPS), the global navigation system of the European Union "Galileo", the Russian global navigation system GLONASS, the China's regional system Beidou, the China's global system COMPASS, India's regional navigation system—IRNSS, or the Japanese regional system QZSS, or the like.

In addition to positioning information, the GNSS receiver may supply the network device with a PPS signal. The PPS signal can be used as one type of time reference signal to provide the synchronization information. This time reference signal comprises a signal with a very sharp rising edge, typically with a flank accuracy of 10 ns, provided with a predetermined rate. From such synchronization information, any network device connected to the GNSS receiver can obtain synchronization.

Some example embodiments of the present disclosure will be discussed in detail below with reference to other figures.

Figure 2:
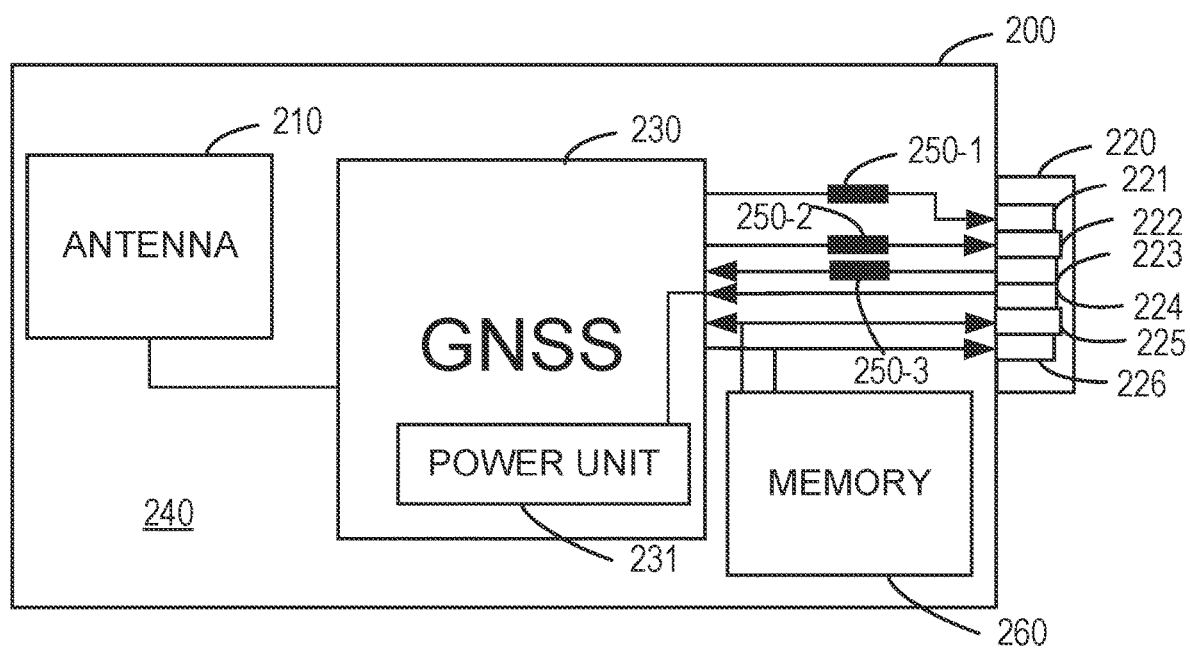
FIG. 2 illustrates a block diagram of an example positioning and synchronization apparatus in accordance with some example implementations of the present disclosure.

FIG. 2 illustrates a block diagram of an example positioning and synchronization apparatus 200 in accordance with some example implementations of the present disclosure. As illustrated in FIG. 2, the positioning and synchronization apparatus 200 comprises an antenna 210, a SFP connector 220, a GNSS receiver 230 and a circuit board 240. The GNSS receiver 230 and the antenna 210 are provided on the circuit board 240. The antenna 210 is connected to the GNSS receiver 230. The GNSS receiver 230 is configured to receive satellite-transmitted signals comprising positioning-related information over the antenna 210.

Typically, the GNSS receiver 230 is associated with a plurality of satellites which are located at well-known positions. Each satellite continuously transmits messages that include the time when the message was transmitted and the satellite position at time of message transmission. The GNSS receiver 230 receives the satellite-transmitted signals by the antenna 210 and calculates its position by precisely timing the signals sent by GNSS satellites high above the Earth. The GNSS receiver 230 uses the messages it receives to determine the transit time of each message and computes the distance to each satellite using the speed of light. Each of these distances and satellites' locations define a sphere. The GNSS receiver 230 is located on the surface of each of these spheres when the distances and the satellites' locations are correct. These distances and satellites' locations are used to compute the location of the GNSS receiver 230 using the navigation equations.

In some example implementations, the GNSS receiver 230 may comprise a Radio Frequency (RF) Front-End module. The RF Front-End module may be connected to the antenna 210 and configured to process RF signals and convert the RF signal into a representation for GNSS signal. In some example implementations, a low-noise amplifier (LNA) may be provided between the antenna 210 and the RF Front-End module. The antenna is conventionally a common source of weak signals. In particular, the antenna may be connected to the GNSS receiver by a transmission line. The signal loss at the transmission line can be avoided by placing an LNA at the antenna. The LNA can reduce unwanted noise and advantageously boost the desired signals' power while adding as little noise and distortion as possible.

In some example implementations, the GNSS receiver 230 may comprise a processing module used to process the signals received from the antenna 210 and output PPS signals and positioning signals. In some example implementations, the GNSS receiver 230 may comprise memory module for storing received or processed data.

In some example implementations, the GNSS receiver 230 may comprise a number of interfaces which are provided either for data communication or memory access. In some example implementations, the GNSS receiver 230 may include a Universal Asynchronous Receiver/Transmitter (UART) interface, which can be used for positioning information communication. In some example implementations, the GNSS receiver 230 may comprise a Inter-Integrated Circuit ($I^2C$) interface. The $I^2C$ interface and may be used for communication with a CPU on a network device.

The SFP connector 220 comprises a plurality of pins, such as twenty pins as defined in accordance with the standard. These pins may be connected to the corresponding module of the GNSS receiver on one hand and configured to be connected to the corresponding pins of a SFP fiber port of a network device on the other hand. For the sake of clarity, only six pins are illustrated in FIG. 2, namely a first pin 221, a second pin 222, a third pin 223, a fourth pin 224, a fifth pin 225, and a six pin 226. The detailed arrangement of the SFP interfacing is illustrated in FIG. 3.

Figure 3:
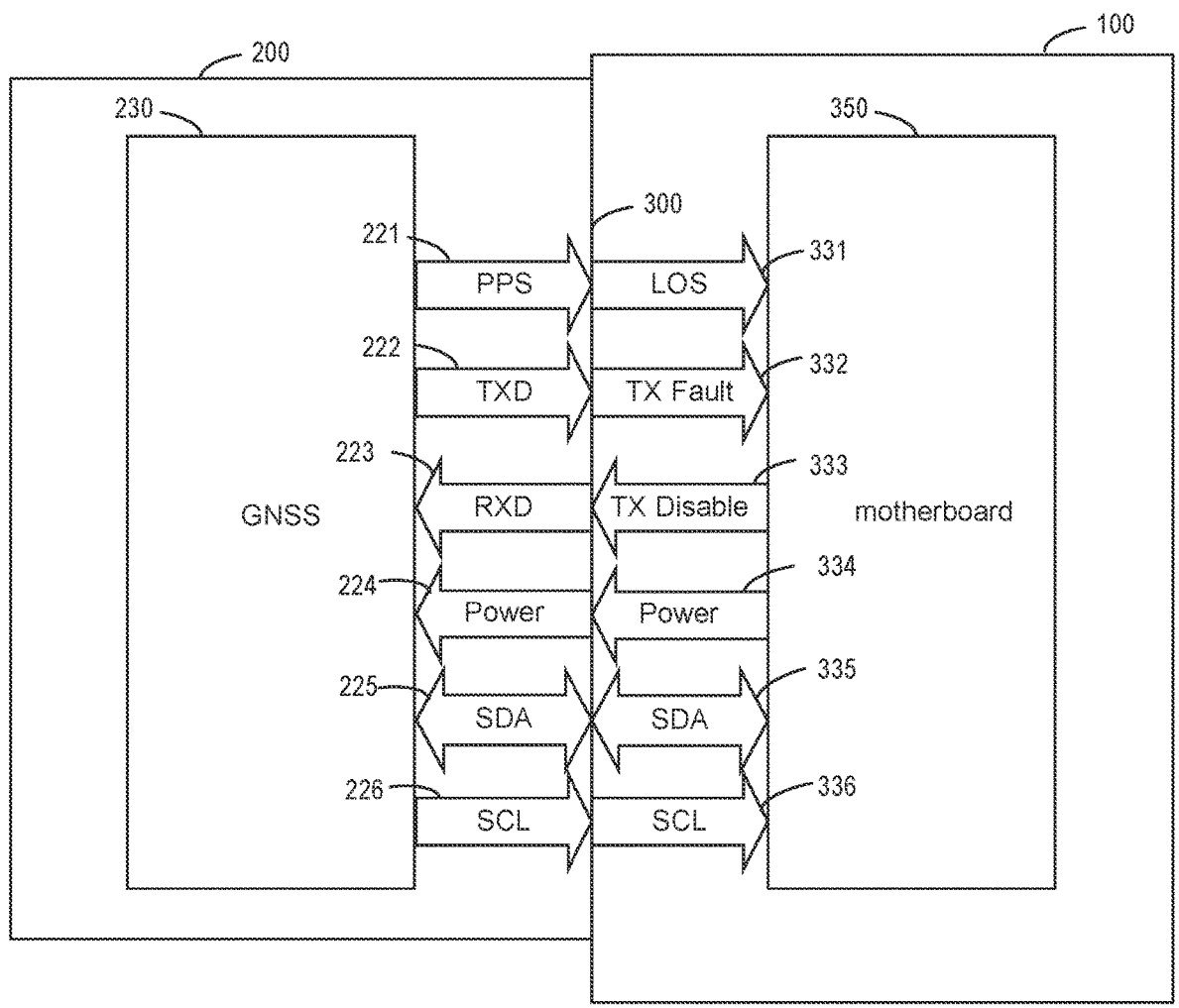
FIG. 3 illustrates a block diagram of an example interfacing between an example positioning and synchronization apparatus and a network device in accordance with some example implementations of the present disclosure.

FIG. 3 illustrates a block diagram of an example interfacing 300 between an example positioning and synchronization apparatus 200 and a network device 100 in accordance with some example implementations of the present disclosure. As illustrated in FIG. 3, the interfacing 300 is formed between the SFP connector 220 of the apparatus 200 and the SFP fiber port 130 of the network device 100. The GNSS receiver 230 communicates with the network device 100, such as a motherboard 350 of the network device 100 over the interfacing 300.

The SFP fiber port 130 is a standard SFP fiber port which may comprise twenty pins. As illustrated in FIG. 3, the SFP fiber port 130 on the motherboard 350 comprises a first pin 331, a second pin 332, a third pin 333, a fourth pin 334, a fifth pin 335, and a six pin 336 connected to the first to six pins of the SFP connector 220 respectively.

For example, typical pins of the twenty pins include receiver data (RD) pins which are the differential receiver outputs and transmitter data (TD) pins which are the differential transmitter inputs.

Another example pin is a loss of signal (LOS) pin. The LOS pin is an open collector output that shall be pulled up with a 4.7 k to 10 k ohm resistor. Pull up voltage is between 2V and VccR+0.3V. A low voltage level at the LOS pin indicates normal operation. In the example implementation illustrated in FIG. 3, the first pin 331 of the SFP fiber port 130 is the LOS pin.

Further, a TX Fault pin is an open collector output that shall be pulled up with a 4.7 k to 10 k ohm resistor on the motherboard 350. Pull up voltage is between 2.0V and VccT+0.3V. When a voltage level is high, the output indicates a fault occurrence at the transmitter such as a fiber transceiver while a low voltage level indicates normal operation. The TX Fault is asserted when bias current of laser exceeds the factory-calibrated threshold level or when output power of transmitter degrades above/below the factory-calibrated threshold level. In the example implementation illustrated in FIG. 3, the second pin 332 of the SFP fiber port 130 may be the TX Fault signal pin.

Correspondingly, a TX Disable pin is an input that is used to shut down the transmitter optical output. It is pulled up within the module with a 4.7 kohm resistor. In the example implementation illustrated in FIG. 3, the third pin 333 of the SFP fiber port 130 may be the TX Disable signal pin.

Moreover, MOD-DEF 0, 1 and 2 are module definition pins. They should be pulled up with a 4.7 k to 10 k ohm resistor on the motherboard 350. MOD-DEF0 indicates that the module is present. MOD-DEF1 is the clock line of two wire serial interface for serial ID, MOD-DEF2 is the data line of two wire serial interface for serial ID. In the implementation illustrated in FIG. 3, the fifth pin 335 of SFP fiber port 130 may be the MOD-DEF2 signal pin and the sixth pin 336 of the SFP fiber port 130 may be the MOD-DEF1 signal pin. In this case, the fifth pin 335 of SFP fiber port 130 is connected with a serial data (SDA) line and the sixth pin 336 of the SFP fiber port 130 is connected with a serial clock (SCL) line of the motherboard 350. These SDA and SCL lines forms I²C bus.

In order to enable the data transmission between the SFP connector 220 and a SFP fiber port 130 of the network device 100, the direction of the data transmission over one pin of the SFP connector 220 may be in conformity with the direction of the data transmission over the corresponding pin of the standard SFP fiber port. That is, a signal output pin may be connected to a signal input pin.

As illustrated in FIG. 3, the SFP connector 220 comprises a first pin 221, a second pin 222, a third pin 223, a fourth pin 224, a fifth pin 225, and a six pin 226. The first pin 221 of the SFP connector 220 is a PPS signal pin. The first pin may be connected to the processing module of the GNSS receiver 230 and configured to be connected to the first pin 331 of the SFP fiber port 130, the LOS pin. In this case, the first pin 221 of the SFP connector 220 is a signal output pin and the first pin 331 of the SFP fiber port 130 is a signal input pin. The GNSS receiver 230 may transmit a PPS signal to the motherboard 350 over the connection established between the first pin 221 of the SFP connector 220 and the first pin 331 of the SFP fiber port 130.

The second pin 222 of the SFP connector 220 is a transmitter data (TXD) signal pin and configured to be connected to the second pin 332 of the SFP fiber port 130, the TX Fault signal pin. In this case, the second pin 222 of the SFP connector 220 is a signal output pin and the second pin 332 of the SFP fiber port 130 is a signal input pin. The GNSS receiver 230 may transmit a signal comprising positioning-related information to the motherboard 350 over the connection established between the second pin 222 of the SFP connector 220 and the second pin 331 of the SFP fiber port 130.

The third pin 223 of the SFP connector 220 is a receiver data (RXD) signal pin and configured to be connected to the third pin 333 of the SFP fiber port 130, the TX Disable signal pin. The second pin 222 and the third pin 223 of the SFP connector may be connected to the interface module of the GNSS receiver 230. In this case, the third pin 223 of the SFP connector 220 is a signal input pin and the third pin 333 of the SFP fiber port 130 is a signal output pin. The GNSS receiver 230 may receive a request signal to obtain the positioning signal over the third pin 223 of the SFP connector 220 from the network device 100 and in response to the request signal, transmit the positioning signal over the second pin pair 222 of the SFP connector 220.

The fourth pin 224 of the SFP connector 220 is a power input pin which may be connected to the power unit of the GNSS receiver 230. The GNSS receiver 230 is configured to be supplied with power over the fourth pin 224.

The fifth pin 225 of the SFP connector 220 is connected with a serial data (SDA) line and sixth pin 226 of the SFP connector 220 is connected with a serial clock (SCL) line. In turn, the fifth pin 225 of the SFP connector 220 is connected to the fifth pin 335 of SFP fiber port 130, the MOD-DEF2 signal pin and the sixth pin 226 of the SFP connector 220 is connected to the sixth pin 336 of the SFP fiber port 130, the MOD-DEF1 signal pin. The SDA line and the SCL line form an I²C bus. The GNSS receiver 230 is configured to communicate with the motherboard 350 of the network device 100 over the fifth pin 225 and the sixth pin 226 via the I²C bus.

By using different pins to transmit PPS signal and positioning signal, the potential collision of the two signals, which may happen in the traditional case that signals are transmitted over one common pin, can be avoided.

It is to be understood that the pins illustrated in FIG. 3 are only examples. Other pins can also be used for data transmission with the SFP connector of the positioning and synchronization apparatus.

Back to FIG. 2, in some example implementations, the apparatus may comprises a memory 260 connected to the I²C bus. The memory 260 is configured to store instructions to be provided to the network device 100, so as to enable the network device 100 to identify the GNSS receiver 230 and configure signal transmissions between every pair of pins.

For example, as illustrated in FIG. 3, the second pin 332 of the SFP fiber port is configured to receive TX fault signals from a SFP transceiver according to the standard when the SFP transceiver is inserted. When the apparatus 200 is inserted into the SFP fiber port 130 at the first time, a processor on the motherboard 350, such as a CPU, will receive configuration information via the I²C bus and configure the data transmission over interfacing 300 to enable the network device 100 to identify the GNSS receiver 230 along with the signals received therefrom.

In some example implementations, the memory 260 may be an Electrically Erasable Programmable Read-Only Memory (EEPROM).

Further, ferrite beads 250 are provided between the GNSS receiver 230 and pins of the SFP connector 220 to filter transmission signal noise. It should be appreciated that a ferrite bead is a type of choke that suppresses high-frequency electronic noise in electronic circuits. As illustrated in FIG. 3, ferrite beads 250-1, 250-2, 250-3 are provided between the GNSS receiver 230 and the first to third pins of the SFP connector 220 respectively. It is to be understood that ferrite beads can also be provided at any signal lines in the apparatus 200.

Moreover, the GNSS receiver 230 comprises a power unit 231 connected to the fourth pin 224 of the SFP connector 220. The power unit 231 is supplied with power over the fourth pin 224 of the SFP connector 240. The antenna 210 comprises an active antenna connected to the power unit 231. In turn, the power unit 231 supplies the active antenna with power. In other example implementations, the antenna 210 may be a patch antenna.

Figure 4:
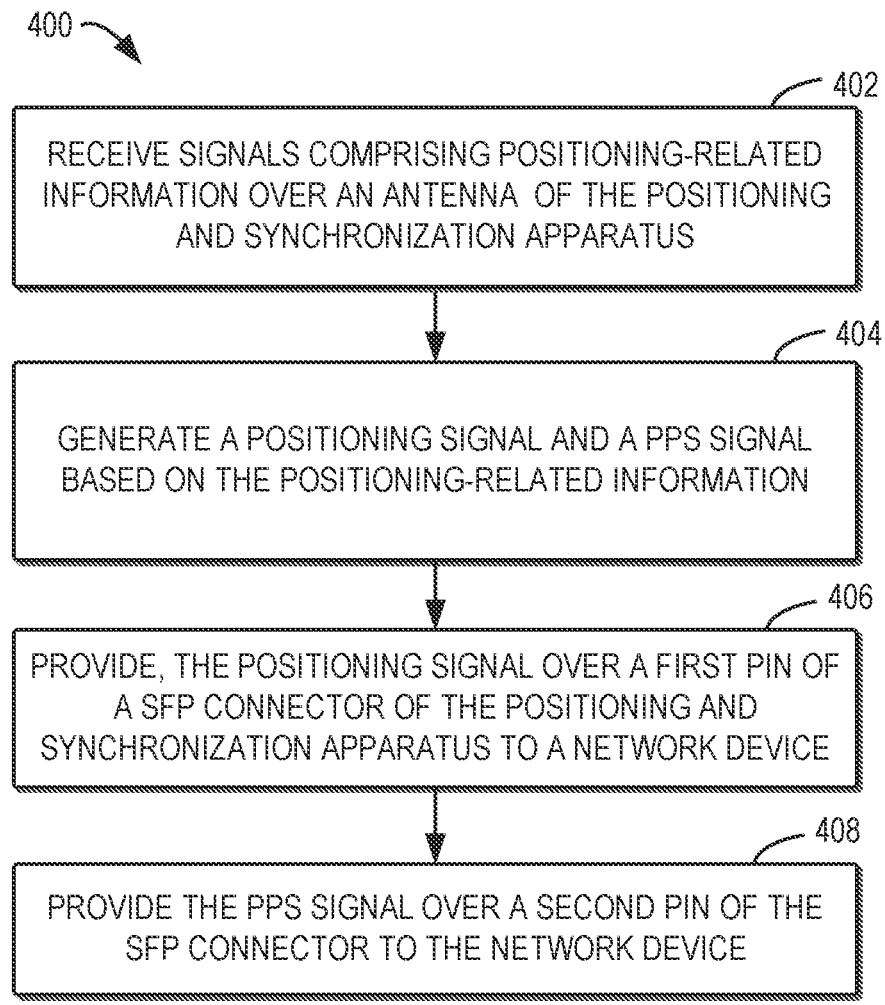
FIG. 4 a flowchart of a method in accordance with some example implementations.

FIG. 4 a flowchart of a method 400 in accordance with some example implementations. For example, the method 400 can be carried out by the positioning and synchronization apparatus 200.

At 402, the positioning and synchronization apparatus 200 receives signals comprising positioning-related information over an antenna of the positioning and synchronization apparatus 200.

At 404, the positioning and synchronization apparatus 200 generates a positioning signal and a pulse per second (PPS) signal based on the positioning-related information.

At 406, the positioning and synchronization apparatus 200 provides, a positioning signal over a first pin of a small form factor pluggable (SFP) connector of the positioning and synchronization apparatus to a network device. In this case, the first pin of the SFP connector is connected to a first pin of a SFP fiber port of the network device. In some example implementations, the positioning and synchronization apparatus 200 receives a request signal over a third pin of the SFP connector connected to a third pin of the SFP fiber port from the network device and in response to the request signal, the positioning and synchronization apparatus 200 provides the positioning signal over the first pin of the SFR At 408, the positioning and synchronization apparatus 200 provides a PPS signal over a second pin of the SFP connector to the network device. In this case, the second pin of the SFP connector is connected to a second pin of the SFP fiber port.

In some example implementations, the positioning and synchronization apparatus 200 may provide instructions to enable the network device to identify the GNSS receiver and configure signal transmissions between the SFP connector and the SFP fiber port.

In some example implementations, the positioning and synchronization apparatus 200 may provide connections between the GNSS receiver and pins of the SFP connector with ferrite beads to filter signal noise.

Figure 5:
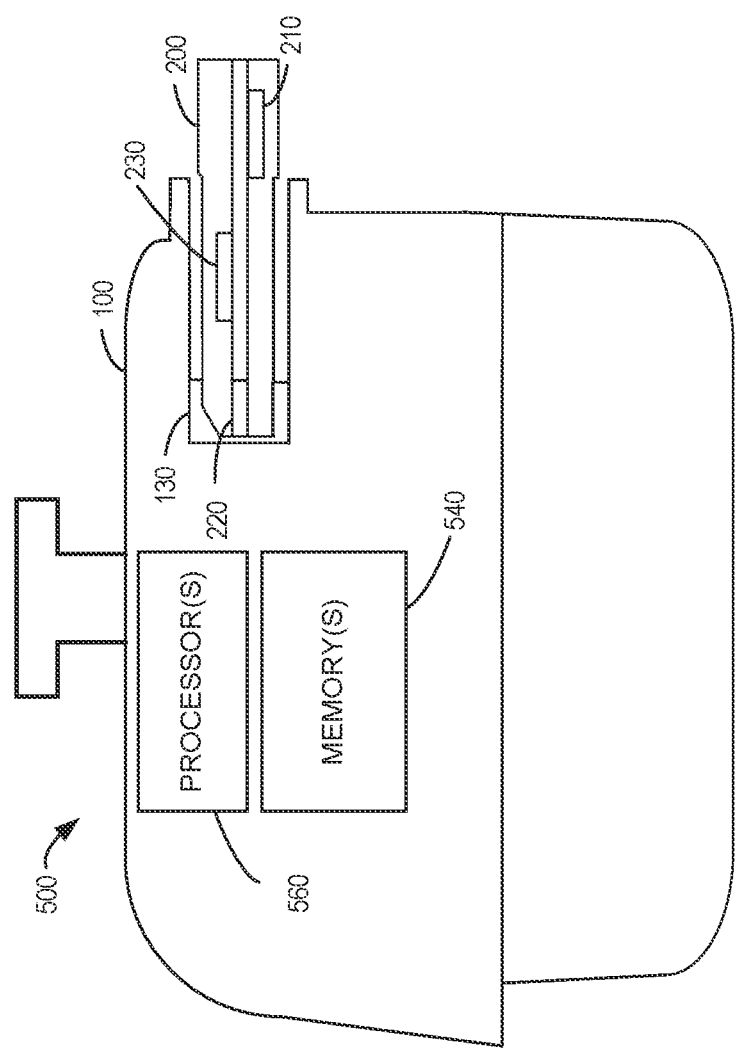
FIG. 5 a block diagram of an example communication system in accordance with some example implementations of the present disclosure.

FIG. 5 a block diagram of an example communication system 500 therein in accordance with some example implementations of the present disclosure. As illustrated in FIG. 5, the communication system 500 comprises a network device 100 for example as described with reference to FIG. 1 and a positioning and synchronization apparatus 200, for example as described with reference to FIG. 2. The network device 100 a SFP fiber port 130. The positioning and synchronization apparatus 200 comprises an antenna 210, an SFP connector 220, a GNSS receiver 230. The SFP connector 220 couples the positioning and synchronization apparatus 200 with the SFP fiber port 130. By means of the SFP connector 220, the positioning and synchronization apparatus 200 is inserted into the SFP fiber port 130 so that the GNSS receiver 230 can provide a positioning signal and a PPS signal over the pins of the SFP connector 220 to the network device 100.

The network device 100 may further comprises at least one processor 560 configured to perform time synchronization based on the PPS signal. The network device 100 may comprises at least one memory 540 storing the positioning signal.

As illustrated in FIG. 5, the positioning and synchronization apparatus 200 is dimensioned such that the antenna 210 is positioned outside a housing of the network device 100. In some example implementations, the positioning and synchronization apparatus 200 may be comprised entirely within a SFP cage. Mechanical specifications of such a cage are e.g. found in to the Small Form Factor committee specification SFF-8432, revision 5.1, sections 3-6.

The present ideas provide for a small simple pluggable synchronization module that has a large flexibility in terms of location. It can for instance be placed in almost any SFP cage, thereby providing a compact structure. Furthermore, for applications that do not need any synchronization or positioning, the positioning and synchronization apparatus can easily be removed and give place for other types of connections, i.e. alternative uses of the standard SFP fiber port of the network device are provided.

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented above may therefore be regarded as a whole or in part as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry or processor includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

What is claimed is:

1. A positioning and synchronization apparatus comprising:
an antenna;
a small form factor pluggable (SFP) connector comprising a first pin connected to a first pin of a SFP fiber port of a network device and a second pin connected to a second pin of the SFP fiber port; and
a Global Navigation Satellite System (GNSS) receiver configured to receive signals comprising positioning-related information over the antenna and to provide a positioning signal over the first pin of the SFP connector and a pulse per second (PPS) signal over the second pin of the SFP connector based on the positioning-related information.

2. The apparatus of claim 1, wherein the SFP connector comprises a third pin connected to a third pin of the SFP fiber port, and
wherein the GNSS receiver is configured to receive, from the network device, a request signal to obtain the positioning signal over the third pin of the SFP connector and in response to the request signal, transmit the positioning signal over the second pin of the SFP connector.

3. The apparatus of claim 2, wherein the first pin of the SFP fiber port is a Transmitter Fault (TX Fault) pin and the third pin of the SFP fiber port is a Transmitter Disable (TX Disable) pin.

4. The apparatus of claim 2, wherein connections between the GNSS receiver and the first, second and third pins of the SFP connector are provided with ferrite beads.

5. The apparatus of claim 2, wherein the SFP connector further comprises a fourth pin connected to a fourth pin of the SFP fiber port, and
wherein the GNSS receiver comprises a power unit connected to the fourth pin of the SFP connector, the power unit being supplied with power over the fourth pin of the SFP connector.

6. The apparatus of claim 5, wherein the antenna comprises an active antenna connected to the power unit, the active antenna being supplied with power by the power unit.

7. The apparatus of claim 5, the SFP connector comprises a fifth pin and a sixth pin connected to a fifth pin and a sixth pin of the SFP fiber port, and
   wherein the GNSS receiver is configured to communicate with the network device over the fifth and sixth pins of the SFP connector via an Inter-Integrated Circuit (I²C) bus, the fifth and sixth pins of the SFP fiber port being connected to the I²C bus.

8. The apparatus of claim 7, further comprising a non-transient memory connected to the I²C bus, and
   wherein the non-transient memory stores instructions to be provided to the network device, so as to enable the network device to identify the GNSS receiver and configure signal transmissions between the SFP connector and the SFP fiber port.

9. The apparatus of claim 1, wherein the second pin of the SFP fiber port is a loss of signal (LOS) pin.

10. The apparatus of claim 1, wherein the antenna comprises a patch antenna.

11. A method, comprising:
   receiving, at a positioning and synchronization apparatus, signals comprising positioning-related information over an antenna of the positioning and synchronization apparatus;
   generating, at the positioning and synchronization apparatus, a positioning signal and a pulse per second (PPS) signal based on the positioning-related information;
   providing, at the positioning and synchronization apparatus to a network device, the positioning signal over a first pin of a small form factor pluggable (SFP) connector of the positioning and synchronization apparatus, the first pin of the SFP connector being connected to a first pin of a SFP fiber port of the network device; and
   providing, at the positioning and synchronization apparatus to the network device, the PPS signal over a second pin of the SFP connector, the second pin of the SFP connector being connected to a second pin of the SFP fiber port.

12. The method of claim 11, wherein providing a positioning signal over a first pin of the SFP connector of the positioning comprising:
   receiving, from the network device, a request signal over a third pin of the SFP connector connected to a third pin of the SFP fiber port; and
   in response to the request signal, providing the positioning signal over the first pin of the SFP in response to the request signal.

13. The method of claim 12, further comprising:
   providing connections between the GNSS receiver and the first pin, the second pin and the third pin of the SFP connector with ferrite beads to filter signal noise.

14. The method of claim 11, further comprising:
   providing, at the positioning and synchronization apparatus to the network device, instructions stored in a non-transient memory to enable the network device to identify the GNSS receiver.

15. The method of claim 11, wherein the second pin of the SFP fiber port is a loss of signal (LOS) pin.

16. A communication system, comprising:
   a network device comprising a small form factor pluggable (SFP) fiber port; and
   a positioning and synchronization apparatus comprising:
   an antenna;
   a SFP connector operable to couple the positioning and synchronization apparatus with the SFP fiber port, the SFP connector comprising a first pin connected to a first pin of the SFP fiber port and a second pin connected to a second pin of the SFP fiber port; and
   a Global Navigation Satellite System (GNSS) receiver configured to receive signals comprising positioning-related information over the antenna and to provide a positioning signal over the first pin of the SFP connector and a pulse per second (PPS) signal over the second pin of the SFP connector based on the positioning-related information.

17. The communication system of claim 16, further comprising at least one processor configured to perform time synchronization based on the PPS signal.

18. The communication system of claim 16, further comprising at least one memory storing the positioning signal.

19. The communication system of claim 16, wherein the positioning and synchronization apparatus is dimensioned such that the antenna is positioned outside a housing of the network device.

20. The communication system of claim 16, wherein the network device comprises one of an access point, a router, or a switch.

* * * * *